(12) United States Patent
McCrory

(10) Patent No.: US 6,513,057 B1
(45) Date of Patent: Jan. 28, 2003

(54) HETEROGENEOUS SYMMETRIC MULTI-PROCESSING SYSTEM

(75) Inventor: Duane J. McCrory, Malvern, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 08/749,760

(22) Filed: Oct. 28, 1996

(51) Int. Cl.⁷ .................................................. G06F 9/00
(52) U.S. Cl. .......................................... 709/102; 710/6
(58) Field of Search ................................ 395/705, 650, 395/734, 500, 709, 800; 340/172.5; 370/858; 709/100, 102; 712/1, 43, 41, 42, 220, 229, 203; 707/1

(56) References Cited

U.S. PATENT DOCUMENTS

| | | | |
|---|---|---|---|
| 3,676,860 A | * 7/1972 | Collier et al. | 710/244 |
| 3,997,895 A | 12/1976 | Cassonnet et al. | 340/172.5 |
| 4,713,806 A | * 12/1987 | Oberlander et al. | 370/358 |
| 4,716,526 A | 12/1987 | Mori et al. | 364/200 |
| 5,228,127 A | 7/1993 | Ikeda et al. | 395/200 |
| 5,274,831 A | * 12/1993 | Katsuta | 712/244 |
| 5,325,526 A | * 6/1994 | Cameron et al. | 709/102 |
| 5,339,443 A | 8/1994 | Lockwood | 395/725 |
| 5,365,606 A | * 11/1994 | Brocker et al. | 709/331 |
| 5,379,428 A | 1/1995 | Belo | 395/650 |
| 5,430,850 A | 7/1995 | Papadopoulos et al. | 395/375 |
| 5,440,752 A | 8/1995 | Lentz et al. | 395/800 |
| 5,457,780 A | * 10/1995 | Shaw et al. | 345/502 |
| 5,504,670 A | 4/1996 | Barth et al. | 364/134 |
| 5,666,519 A | * 9/1997 | Hayden | 703/23 |
| 5,734,910 A | * 3/1998 | Corrigan et al. | 710/261 |
| 5,802,373 A | * 9/1998 | Yates et al. | 717/139 |
| 5,805,895 A | * 9/1998 | Breternitz, Jr. et al. | 717/160 |
| 5,835,775 A | * 11/1998 | Washington et al. | 717/153 |
| 5,958,061 A | * 9/1999 | Kelly et al. | 714/1 |

OTHER PUBLICATIONS

Simon C.J. Garth "Combining RISC and CISC in PC Systems", 1991.*

Lindh L., et al.; "From Single to Multiprocessor Real–Time Kernels in Hardware" Proceedings. Real–Time Technology And Applications Symposium (Cat. No. 95 TH855), Proceedings Real–Time Technology And Applications Symposium, Chicago, Il, May 15–17, 1995, ISBN 0–8186–6980–2, 1995, Los Alamitos, CA, IEEE Comput. Soc. Press, pp. 42–43.

Steensgaard, B., et al., "Object and Native Code Thread Mobility Among Heterogeneous Computers", Operating Systems Review (SIGOPS), vol. 29, No. 5, Dec. 1, 1995, pp. 68–78, XP000584818.

* cited by examiner

*Primary Examiner*—St. John Courtenay, III
*Assistant Examiner*—Lewis A. Bullock, Jr.
(74) *Attorney, Agent, or Firm*—Sterne, Kessler, Goldstein & Fox P.L.L.C.; Lisa A. Rode; Mark T. Starr

(57) ABSTRACT

In a heterogenous symmetric multi-processing system, processors from distinct families of processors are integrated on a single platform. The processors are coupled to an implementation specific communication mechanism through family specific bus interface converters. Shared memory and I/O subsystems may be coupled to the implementation specific communication mechanism as well. An operating system maintains separate ready queues for each family of processors. Each ready queue is responsible for scheduling execution of process threads on its associated family of processors. The operating systems facilitates execution of both single mode binary code files and mixed mode binary code files. When a thread is created, the operating system determines the initial processor family to associate with the thread based on the binary code stream that the thread will begin executing. The thread is placed in the ready queue of that family. As the thread executes it may require services from another family of processors in order to natively execute the next set of instructions in the binary code file. When services are required, the operating system reschedules those instructions on a processor which executes those instructions natively. Means are provided to return the thread to a processor in the previous family of processors in order to support mixed mode instruction stream subroutine support.

23 Claims, 5 Drawing Sheets

HETEROGENEOUS SMP SYSTEM

SYMMETRIC MULTI-PROCESSOR SYSTEM (SMP)

SMP OPERATING SYSTEM THREAD QUEUEING

HETERGENEOUS SMP SYSTEM

HETERGENEOUS SMP ARCHITECTURE EXAMPLE

HETEROGENEOUS SMP OS THREAD QUEUEING EXAMPLE

HETEROGENEOUS SYMMETRIC MULTI-PROCESSING SYSTEM

BACKGROUND OF THE INVENTION

1. Field of the Invention

The present invention relates generally to symmetric multi-processor (SMP) computer systems, and more particularly, to heterogeneous SMP computer systems.

2. Related Art

In symmetric multi-processor (SMP) computer systems, two or more processors share memory and IO devices, for example a display terminal. An operating system, generally stored in the shared memory, supports the scheduling of tasks among the various processors.

SMP systems permit parallel processing of tasks to increase system throughput. For instance, where an applications program requires a number of tasks to be performed or where several applications are running simultaneously, the operating system in an SMP system divides and schedules these tasks among the various processors in a system. An SMP system performs tasks in parallel, thereby increasing the number of tasks which can be executed in a given amount of time.

Operating systems such as Windows NT are available for supporting one or more processors in a symmetric multi-processing environment. These operating systems permit the processors to see the same memory space with each physical memory location in the memory space having an address which is common to all of the processors.

Operating systems exist for supporting various types of processors, including, for example, Intel 80X86, DEC Alpha, IBM/Motorola Power PC, and MIPS R4000. Current SMP hardware implementations and operating systems, however, support efficient execution of only a single processor family instruction set on a given platform. In other words, an Intel based X86 SMP system is not well suited to execute code compiled for a DEC Alpha system because current SMP systems are limited to using processors from only a single family of processors and often require that the processors even be of the same type within a particular family.

Computer users, however, often have multiple computing requirements, such as word processing, data processing, graphics generation and communications. Although applications program's for these different computing requirements are available for various types of processors, a user is faced with a purchasing dilemma when a preferred application is not compatible with their existing processor. In such a case, the user must either substitute the less desirable program for the desired one or purchase a new computer having a processor which is compatible with the desired program. Similarly, an application which is compatible with a user's processor may be priced significantly higher than a similar application which is not compatible with the user's current processor. Again, the user must either buy the less desirable program or a new computer. Computer users are, therefore, restricted in their applications software choices by their processor.

Emulation systems are available for some processors which permit non-native instruction sets to be executed on the processor. This is a common practice on DEC Alpha systems when executing Intel 80X86 binaries. Essentially, an emulation program provides subroutines written in a processor's native language permitting execution of non-native instructions. When the program loader detects a non-native application, it calls a native emulation program associated with the non-native application. The native emulation. program contains native code for performing the non-native instruction on the native processor and, possibly, for instructing the native processor to output data in a non-native communication protocol. Emulation of a program, however, is usually eight times or more slower than executing binary code directly on a native processor.

A single mode binary code file is a program compiled into native instructions for a single type of processor family. Mixed mode binary code files contain instruction sequences (for different functions or subroutines) for more than one type of processor or family of processors. For any given function or subroutine, however, binary code is provided for executing that function or subroutine on only one type of processor or family of processors.

Current SMP systems employ only a single type of processor or family of processors and execute only single mode binary code files. Also, programs compiled to execute on a single family of processors suffer from the same limitations as the processors they employ. Examples of such limitations include interrupt latency, byte ordering, floating point and integer performance. As a result, programmers are unable to take advantage of particular features from multiple families of processors.

What is needed, therefore, is a heterogenous symmetric multi-processor system (HSMP) employing heterogenous processors for executing a variety of types of binary code on native processors. An HSMP system should include an operating system for scheduling execution of various types of binary code on native processors, including both single mode binary code and mixed mode binary code.

SUMMARY OF THE INVENTION

The present invention provides a heterogenous symmetric multi-processor (HSMP) system and methods for operating the HSMP system.

In a preferred HSMP system, one or more processors from a first processor family are packaged on a single printed circuit card along with necessary bus interface converters for coupling the card to a common bus. Additional circuit cards include processors from other families of processors. These circuit cards are coupled to the common bus through additional bus interface converters. The bus provides each processor with access to common IO devices and memory.

An HSMP operating system (HSMP OS) controls scheduling operations on the HSMP system by maintaining separate ready queues for each family of processors. Each ready queue coordinates the execution of process threads for its associated family of processors.

The operating system supports scheduling of mixed-mode binary code as well as single mode binary code. Single mode binary code is code designed to run on only a specific processor or family of processors. Mixed mode binary code includes at least two types-of code, a first type of code designed to run on a first type of processor or family of processors and a second type of code designed to run on a second type of processor or family or processors. With mixed mode binary code, a programmer can take advantage of strengths or particular capabilities of different processors within a single application program.

In the HSMP OS, when a thread is created, the HSMP OS determines the initial processor family to associate with the thread based on the binary code stream that the thread will begin executing.

In an alternative embodiment the HSMP OS is itself a single mode binary code file and includes specialized interfaces to enable a thread to transition between processor families across kernel service calls. This involves scheduling the kernel request on a processor which is native to the HSMP OS and rescheduling the non-native processor to execute some other thread which is in the ready queue for that processor family. The reverse transition occurs when the kernel service call completes.

Three methods are disclosed for notifying, an operating system when a mixed mode binary file requires a change in processor family to continue instruction stream execution.

In a first method, a mixed mode binary file: includes an instruction which is common to all the processors in the system and which, when executed, will not cause adverse side effects but will cause an unexpected entry into the operating system (e.g. an invalid instruction). This commonly invalid instruction serves as a signal to the operating system that a processor switch may be required.

In a second method, a mixed mode binary file includes special jacket libraries containing code designed for a particular processor or family of processors. Each jacket library includes an indicator for indicating which processor is required for executing the code contained in the jacket library.

In a third method, a new instruction is included in a mixed mode binary file which is interpreted identically by all of the processors in the system. The new instruction includes an operand for identifying which of the processors is required for executing a stream of binary code which follows the operand.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

In symmetric multi-processing (SMP) systems, a plurality of processors have access to a common memory through one or more data and address busses. Compared to single processing systems, SMP systems provide improved system throughput by dividing processing tasks among the processors in the, system. By employing a shared memory, data files and applications programs stored in the shared memory are accessible by all of the processors in the system, thus saving memory space and money. Typical SMPs also share a display and various other peripheral components between several processors.

Figure 1:
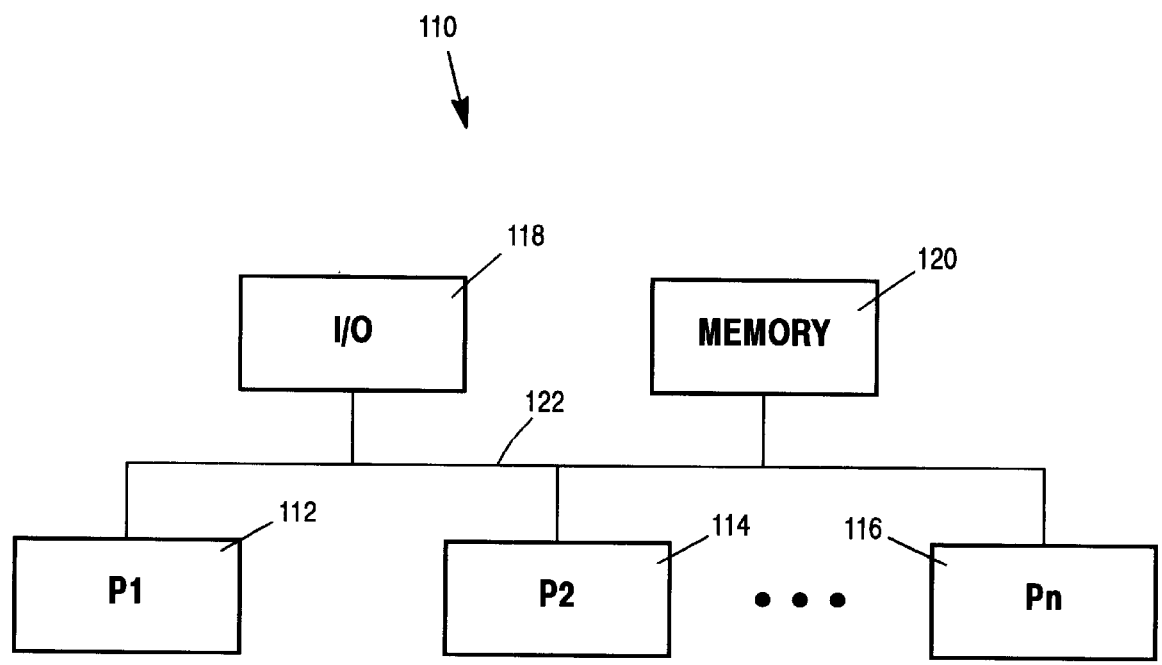
FIG. 1 is a block diagram of a homogeneous symmetric multi-processing system.

Referring to FIG. 1, a simplified block diagram of a homogenous symmetrical multi-processing system 110 is provided. System 110 includes a plurality of processors 112, 114 and 116 which belong to a single family of processors. Processors 112–116 are usually the same processor type, for example, Intel Pentium 133 MHz, within a processor family, for example Intel X86.

System 110 includes a common IO 118 which may include various 10 buses for interfacing system 110 with communications networks and peripherals, for example, disks, tapes and displays.

A shared memory 120 may store data and applications programs for use by one or more of processors 112–116.

Processors 112–116, IO 118 and memory 120 are coupled together through an implementation specific mechanism 122 which may be shared.

An operating system, which may be stored in memory 120, schedules execution of process threads on processors 112–116. A process thread is the basic entity for which the operating system allocates CPU time. The CPU instructions for a thread are stored in one or more binary code files. A binary code file may be an application program obtained through IO 118 or from memory 120. A processor executes code for only a single thread at a time.

Since only one thread may be active on a processor at a time, there can only be as many active threads as there are processors. In multi-tasking environments, where there may be many more threads than there are processors, the operating system must include some mechanism for tracking threads which are ready to execute but for the lack of an available processor. Preferably, the operating system maintains a ready queue for linking threads which are waiting for an available processor. Preferably, the operating system also includes a mechanism for tracking waiting threads which are waiting for some event such as external input from a user or an event which will be caused by another thread.

Figure 2:
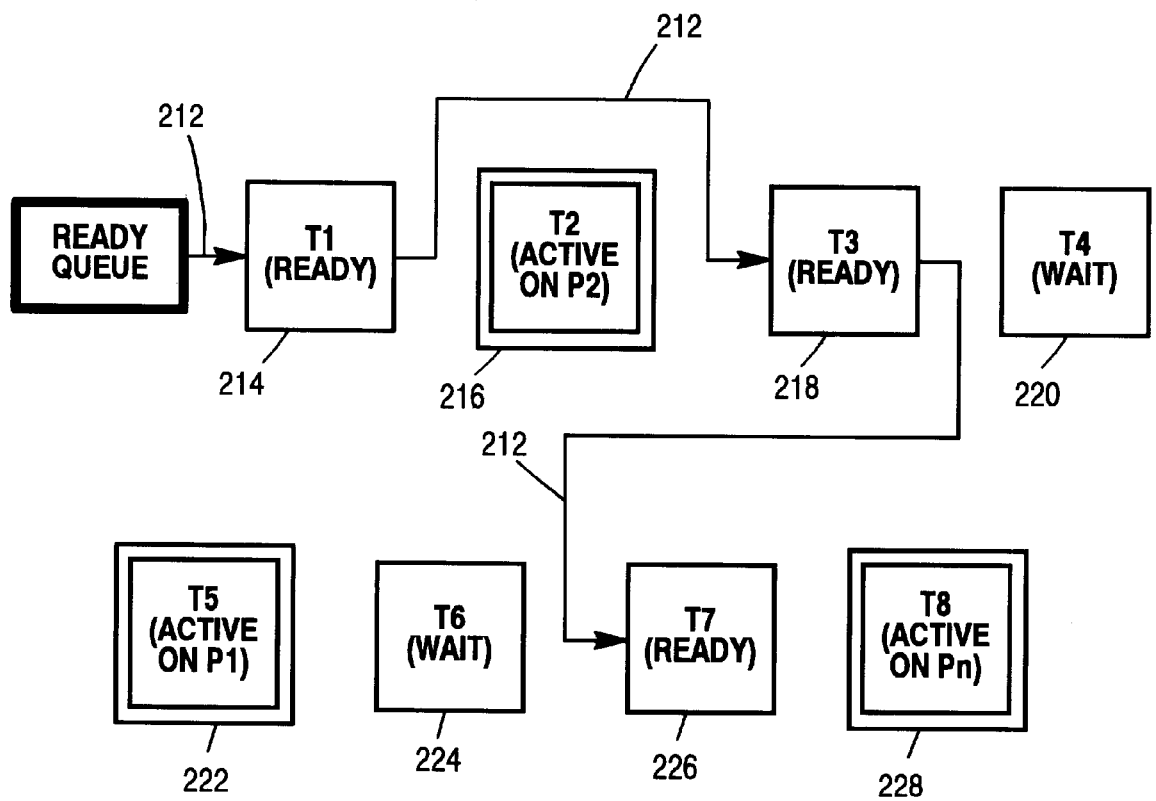
FIG. 2 is a block diagram of a ready queue maintained by an operating system for a homogenous symmetric multi-processing system.

Referring to FIG. 2, a tracking system 210 is shown for tracking threads in an SMP system. Preferably, tracking system 210 includes a ready queue, maintained by an operating system, for scheduling execution of process threads on processors 112–116.

Recall that only one thread can be processed at a time on a processor. The number of active threads, therefore, cannot be greater than the number of processors n in system 110. Suppose, for example, that the number of processors n in system 110 is three. In that case, no more than three threads can be actively processed at a time. Tracking system 210 shows three active threads 216, 222 and 228 for the above example. Thread 216 is active on processor 114 (P2), thread 222 is active on processor 112 (P1) and thread 228 is active on processor 116 (Pn).

For threads that are ready to be executed but lack an available processor, the operating system maintains a ready queue 212 for scheduling execution of those process threads when one or more of processors 112–116 become available. In the example of FIG. 2, "ready" threads include threads 214, 218 and 226. Ready threads 214, 218 and 226 are placed in ready queue 212 to wait their turn for an available processor. Ready queue 212 is often implemented as a linked list.

In addition to the active and ready threads, the operating system also tracks threads which are in a wait state, possibly waiting for an external event, such as user provided input, or an internal event, such as termination of an active thread. In FIG. 2, threads 220 and 224 are waiting on some event to occur.

When one of active threads 216, 222 or 228 completes execution or transfers to a waiting state, the associated processor is released and made available for execution of the next ready thread in ready queue 212.

Referring back to FIG. 1, any one of a variety of processor families can be employed in SMP system 110. Briefly, processors families are generally determined by their native instruction sets. A native instruction set is the set of binary instructions for which a processor is designed to accommodate or which control the processor. There are, for example, an X86 family of Intel processors which are controlled by an associated native instruction set, a DEC Alpha family, an IBM Power PC family, etc. Native instructions are found in binary code files compiled for a particular processor. Instructions are organized as a collection of binary data which represents actions to be performed on the architecturally visible elements of the processor.

Operating systems are available for multiple families of processors. For example, Windows NT is available for Intel X86 systems, DEC Alpha systems and others. Briefly, such an operating system is created in a high level programming language such as C. For operation on a particular type or family of processors, the high level source code program is compiled into a binary code file native to that type or family of processors. Thus, a given compiled operating system operates only on the family of processors for which it was compiled. It does not operate on heterogenous processor families.

Processor families are also distinguishable by their architectures. This includes architecturally defined register and operators along with external interfaces (for example, memory addressing, bus timing and control signals). For example, data and address bus widths, pin layouts, memory addressing format and data byte ordering, can vary by processor family.

SMP systems are designed as homogeneous systems where all of the processors are from the same family of processors. This allows SMP systems to employ currently available operating systems, applications programs and peripheral devices. Where an SMP system employs only a single family of processors, however, the SMP system is limited to application programs and peripheral devices designed for that particular family only.

SMP system 110, therefore, although more powerful than a single processor system or even a group of similar individual processor systems, is still restricted to running binary code designed around a single processor family. If a user wishes to run binary code designed for a different processor, the user will have to employ an emulating system or will have to purchase a system designed around the other processor family.

Figure 3:
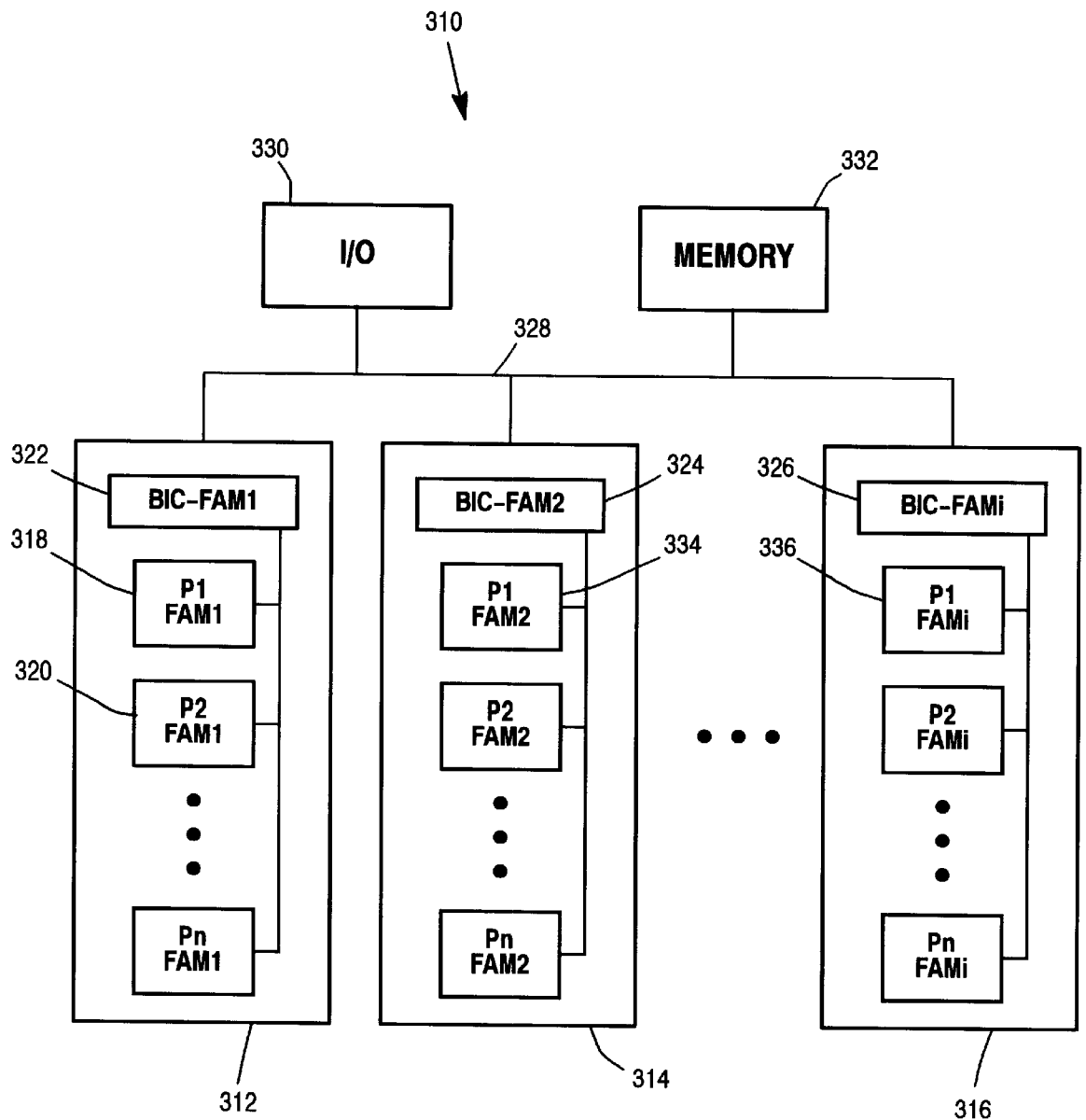
FIG. 3 is a block diagram of a heterogenous symmetric multi-processing system having a number of processor families.

Referring to FIG. 3, a block diagram of a heterogenous SMP system 310 is provided. System 310 is designed to simultaneously process any of a variety of types of binary code files for various instruction sets. In a preferred embodiment, system 310 can even transition mixed mode binary code between processor families so that all code is processed on a processor native to that code.

Heterogenous SMP (HSMP) system 310 supports a plurality of processors and a plurality of processor families. Each processor board 312–316 includes one or more individual processors belonging to the same family of processors. For example, processor family 312 may be an Intel family of processors, where processor 318 is an Intel Pentium 200 MHz and processor 320 is an Intel Pentium 166 MHz processor with both processors running at the same external bus speed. Similarly, processor family 314 may be a DEC family of processors.

In homogenous systems, common data buses, address buses, timing and control buses can be employed because all of the processors, being from the same family, have similar communication protocols. In heterogenous systems, however, in order to employ common data buses, address buses and control buses to communicate between the various processors, memory and I/O, some interfacing mechanism must be provided between each family of processors and the common data, address and control buses.

Preferably, such an interface mechanism is provided as a combination of an implementation specific communication mechanism or bus 328 and bus interface converter devices 322–326.

Implementation specific communication mechanism 328 acts as a data and control bus for interfacing processor boards 312–316 to an IO subsystem 330 and a shared memory 332.

Bus interface converter devices 322–326 provide physical and logical external conversions for coupling the processors within a processor family to implementation specific communication mechanism 328. Each bus interface converter is unique to a processor family and possibly unique to a processor within a processor family. The Intel 80486 and the Intel Pentium, for example, are in the same processor family but have different external interfaces and would probably require different bus interface converters. Bus interface converter devices 322–326 may include additional functionalities such as memory cache, IO interfacing, etc. Alternatively, the function of bus interface converter devices 322–326 may be incorporated into implementation specific communication mechanism 328 or into the individual processors themselves.

In order to permit system 310 to communicate and interface with external peripherals, including possibly a user, I/O subsystem 330 is provided between the external peripherals and the implementation specific communication mechanism 328. I/O subsystem 330 provides necessary hardware and software for transferring data between implementation specific communication mechanism 328 and any external devices or the processors.

Shared memory 332 supports all of the processors within each family of processors 312–316. Shared memory 332 stores data, applications, programs and operating systems software.

An operating system, which may be a modification of an existing operating system, controls and schedules execution of code on the various processors in system 310. Under control of the operating system, all of the processors see the same memory space and each physical memory location in the memory space has an address which is common between all of the processors.

In a preferred embodiment, all of the processors in system 310 are controlled by a heterogeneous symmetric multiprocessing operating system (HSMP OS). The HSMP OS maintains a separate ready queue for each family of processors for scheduling the execution of process threads on the various system processors.

Under control of the HSMP OS, both single mode binary and mixed mode binary files can be executed on system 310.

Mixed mode binary files take advantage of processor attributes from different families of processors within a single applications program. For example, mixed mode binary files may take advantage of the graphics generating capabilities of one processor and the data processing capabilities of a second processor.

To support mixed mode binary files, however, the HSMP OS must permit transfer of threads from one family of processors to another. For example, a thread which begins with a processor from processor family FAM1 on processor board 312 may, at some point, read instructions in its code stream that requires service from a processor in processor family FAM2 on board 314. Where this occurs, the operating system in memory 332 must be able to initiate the processor thread in a queue associated with processor family FAM1 and must also be able to transfer that thread to a queue associated with processor family FAM2.

Figure 4:
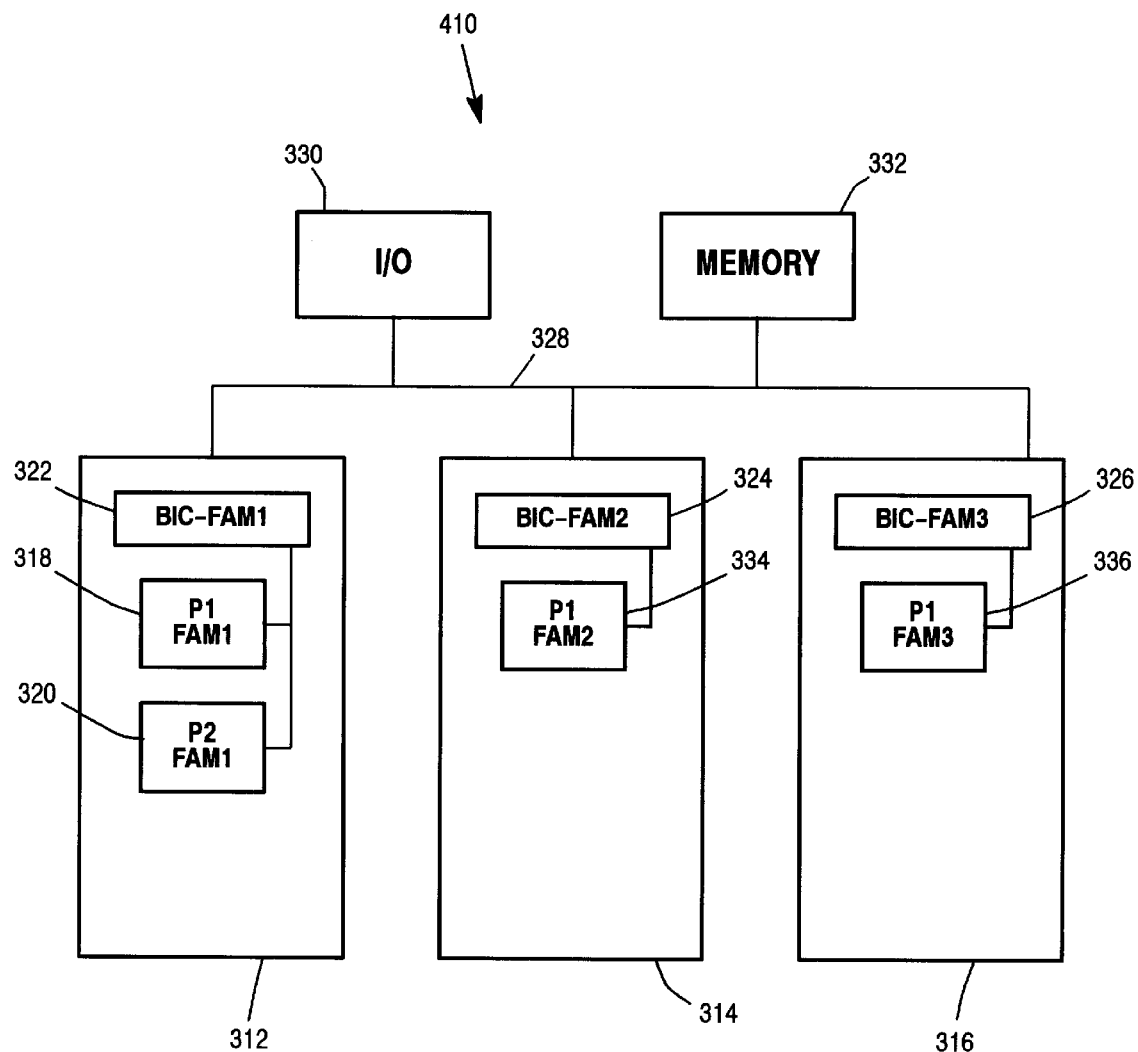
FIG. 4 is a block diagram of a heterogenous symmetric multi-processing system having three families of processors.

Referring to FIG. 4, HSMP system 310 is reproduced as system 410 where the number of processor families i is 3. A first family of processors FAM1 on board 312 includes processors 318 and 320. A second family of processors FAM2 on board 314 includes processor 334 and a third family of processors FAM3 on board 316 includes processor 336.

An operating system, preferably stored in memory 332, is provided for scheduling tasks on processors 318, 320, 334 and 336. The operating system is responsible for scheduling the execution of process threads on the system processors 318, 320, 334 and 336. A process thread is represented by a data structure maintained in memory 332 and associated with the binary code file obtained from IO 330 or memory 332.

The operating system provides programming services which create, destroy and manipulate the state of threads. The operating system provides a scheduling policy for determining when a ready thread should be swapped with an active thread on a processor. Usually, the scheduling policies are automatically invoked at predefined intervals and when a thread voluntarily yields the processor because it needs to wait. An external interrupt, such as an IO completion signal, may preempt an active thread in favor of a higher priority thread that was waiting on the event.

Because the operating system maintains separate ready queues for each family of processors, three separate ready queues are maintained for scheduling tasks among the three families of processors 312, 314 and 316.

Figure 5:
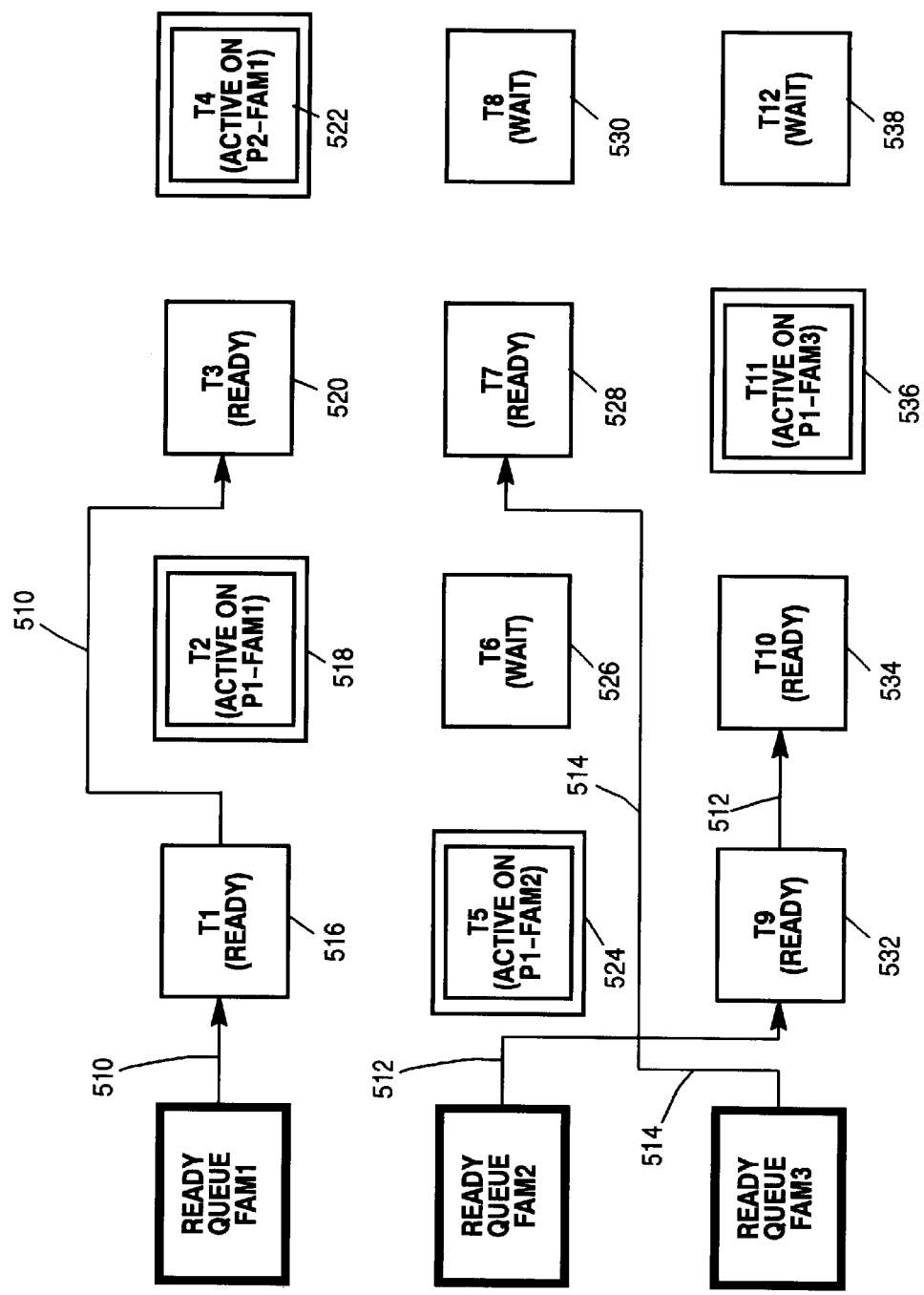
FIG. 5 is a block diagram of a three independent ready queues maintained by an operating system for a heterogenous multi-processing system.

Referring to FIG. 5, blocks 516–538 represent various task threads T1–T12, which have been initiated. A thread may be in any of three states, including active, ready and waiting. The operating system schedules task threads 516–538 for execution on processors 318, 320, 334 and 336.

Active threads are those whose associated code is currently being executed by a processor. Because there are four processors in system 410, a total of four threads may be active in the system at any one time. Thread 518, for instance, is active on processor P1-FAM1 318, thread 524 is active on processor P1-FAM2 334, thread 536 is active on processor P1-FAM3 336 and thread 522 is active on processor P2-FAM1 320.

Ready threads are those threads whose associated code is ready to execute but are not executing due to lack of an available processor. Ready queues 510, 512 and 514 track these ready threads for processing on processor families FAM1, FAM2 and FAM3, respectively. For example, ready queue 510 tracks threads for processors P1-FAM1 318 and P1-FAM1 320. Threads 516 and 520 are in queue 510 and are, therefore, in line for the next available processor in that family. Recall that thread 518 is currently active on processor P1-FAM1 and thread 522 is active on processor P2-FAM1. When thread 518 releases processor 318 or when thread 522 releases processor 320, therefore, the released processor will begin executing code from thread 516 or 520, depending on the priority of those threads.

Where more than three families of processors are included in processor system 310, the operating system maintains an additional ready queue for each additional family of processors.

For each new thread created, the HSMP OS determines the initial processor family to associate with that thread, based on the binary code stream that the thread will begin executing. As the thread executes, it may require kernel services. The HSMP OS schedules kernel services in a ready queue native to the instruction stream of the kernel service. Upon completion of the kernel service, control is returned to the originating processor or family of processors.

Threads 526, 530 and 538 are currently in a wait state, waiting for some event, possibly external input from an operator or completion of some other tasks, before entering a ready state.

When executing mixed mode code, a mechanism must be provided for indicating to the operating system or the thread transitioning mechanism, when a thread transition is required. While any mechanism or means which indicates that a change of processors is required, preferably, one of the three alternative methods disclosed below is employed.

In a first method, a mixed mode binary file includes an instruction which is invalid on all of the processors in the system. Such an instruction, by definition, is not found in any of the native instruction sets for the processors employed. In other words, the instruction is really not a currently recognized instruction at all. This invalid instruction is selected so that, by being invalid, it causes an unexpected entry into the operating system but without causing adverse side effects. Such an unexpected entry or interruption of the operating system serves as a signal to the operating system that a processor switch may be required.

Upon receiving such an interruption, code following the new instruction is examined to determine which processor family is native to the code. If the processor native to the code is the currently active processor, then the currently active processor is instructed to continue execution. If the processor native to the code is not the currently active processor, then the operating system initiates a thread transition from the current processor to a family native to the subsequent instruction stream.

In a second method for supporting mixed mode binary code files, a mixed mode binary file invokes special jacket libraries specific to the processor type and operating system. Each jacket library provides an operating system specific implementation used to transition the thread between processor families.

Each jacket library function determines (by an implementation specific mechanism, for example, statically or by interrogating the actual library function) the processor family required to execute the actual library function natively. The jacket library function invokes the operating system in order to transition the thread to the processor family associated with the actual library function. The operating system modifies the thread context so that the actual library function is invoked and when it returns the thread resumes in the corresponding jacket library function on an appropriate processor family.

This second method is particularly useful where the first method cannot be employed. This may occur, for instance, where there is no common invalid instruction which will not cause adverse side effects in the system.

In a third method of supporting mixed mode binary code files, a mixed mode binary code file contains a new instruction which is readable by all of processors in a system. The new instruction includes an operand for identifying which of the processors is required for executing a stream of binary codes which follows the operand.

In operation, the new instruction is inserted at the beginning of each new set of processor family specific entry points in the code. When a processor reads the new instruction, a determination is made, either by the processor or the operating system, based on the operand, as to which family of processors is required for the code which follows the new instruction. As with the first and second methods, if it is determined that the currently active processor is native to the code, then the currently active processor is instructed to continue execution. If it is determined that a different family of processors is native to the code, the processor causes a trap into the operating system which initiates a thread transition from the current processor family to a family native to the new code.

The third method differs from the second in that the new instruction itself indicates when a change of processors is required. In the second method it is the start of a jacket library function which causes the system to query whether a new processor is required. The third method requires a new instruction which would be included in native instruction sets of new processors for inclusion in such a HSMP system.

Obviously, there are advantages associated with each of the three methods so that the ultimate choice of which method or methods to employ is a design choice based on those advantages.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A system employing multiple heterogeneous processors, comprising:
    a memory;
    at least two processors coupled to said memory, each of said at least two processors having distinctly different native instruction sets; and
    a single operating system which supports scheduling of said at least two processors to execute a process thread including instructions native to each of said at least two processors;
        wherein said operating system employs at least one ready queue for each of said at least two processors, and wherein said operating system is adapted to transition said process thread from one of the at least two processors to the other of said at least two processors when said process thread instructions transition from instructions native to the one of the at least two processors to instructions native to the other of the at least two processors.

2. The system of claim 1, wherein said at least two processors each can execute an optional processor instruction which acts as a signal to said operating system to facilitate efficient scheduling of said at least two processors, whereby said optional processor instruction facilitates support of binary code files that mix native instructions from said at least two processors.

3. The system of claim 1, wherein an instruction which is not native to any of said at least two processors is used as a signal to said operating system to facilitate efficient scheduling of said at least two processors, whereby said instruction facilitates support of binary code files that mix native instruction from said at least two processors.

4. A heterogeneous multi-processor system, comprising:
    a bus;
    a first processor from a first family of processors having a first native instruction set;
    first coupling means for coupling said first processor to said bus;
    a second processor from a second family of processors having a second native instruction set different from said first native instruction set;
    second coupling means distinct from said first coupling means for coupling said second processor to said bus;
    a shared memory coupled to said bus for storing data and applications software for said processors; and
    a single operating system which supports scheduling of said first and second processors to execute a process thread including first instructions native to said first processor and second instructions native to said second processor;
    wherein said operating system employs at least one ready queue for each of said at least two processors, and wherein said operating system is adapted to transition said process thread from said first to said second processor when said process thread instructions transition from said first to said second instructions.

5. The system of claim 4, wherein;
    said bus is an implementation specific communication mechanism designed to act as a data and control bus for interfacing said first and second processors with said shared memory;
    said first coupling means includes a first bus interface converter device for providing physical and logical conversions on data and control signals transmitted between said first processor and said bus; and
    said second coupling means includes a second bus interface converter device for providing physical and logical conversions on data and control signals transmitted between said second processor and said bus.

6. The system of claim 5, further comprising an external I/O device coupled to said bus for coupling said memory and said first and second processors to external devices.

7. The system of claim 4, further comprising:
    an operating system for controlling operation of said first and second families of processors, said operating system maintaining a first ready queue for controlling scheduling of operations on said first family of processors, said operating system maintaining a second ready queue for controlling scheduling of operations on said second family of processors.

8. The system of claim 7, further comprising:
    means for executing a mixed mode binary code file including means for detecting when a processor change is required during execution of the mixed mode binary code file.

9. The system of claim 8, wherein said means for detecting includes an instruction stream in said mixed mode code file which is unrecognizable by said first and second processors, said instruction stream generating an unexpected entry into said operating system for indicating that a processor switch may be required.

10. The system of claim 8, wherein said means for executing a mixed mode binary code file invokes a jacket library in the mixed mode code file, said jacket library including single mode code readable by one of said first and second processors and means for indicating which of said first and second processors is required for executing said single mode code.

11. The system of claim 8, wherein said means includes an instruction in the mixed mode code file which is readable by said first and second processors, said instruction including an operand for identifying which of said first and second processors is required for executing a stream of binary code which follows said operand.

12. A system employing multiple heterogeneous processors, comprising:
   a memory:
   at least two processors couple to said memory, each of said at least two processors having distinctly different native instruction sets;
   an external I/O device coupled to said memory and to said at least two processors, said external I/O device coupling said memory and said first and second processors to external devices; and
   means for executing a mixed mode binary code file on said at least two processors, said mixed mode binary code file including a first single mode binary code segment native to one of the least two processors and a second single mode binary code segment native to the other one of sold at least two processors, said means including determining means for determining which of said at least two processors is capable of executing said first segment of single mode binary code within said mixed mode binary code file, detecting means for detecting when a processor change is required to execute said second code segment, said switching means responsive to said detecting means for switching execution between the one processor and the other processor of said at least two processors when necessary to execute said second-single mode binary code segment.

13. The system of claim 12, wherein said means includes an operating system for executing said mixed mode binary code files.

14. The system of claim 13, wherein said operating system contains mixed mode binary code files.

15. The system of claim 13, wherein said operating system contains specialized interfacing means for rescheduling a thread from one processor family to another.

16. The system of claim 13, wherein said operating system includes means for scheduling process threads.

17. The system of claim 16, wherein said operating system includes means for tracking waiting process threads.

18. The system of claim 16, wherein said operating system includes means for tracking active process threads.

19. An operating system method for controlling execution mixed mode binary code files in symmetric heterogenous multi-processor systems having at least two processors coupled to a memory, each of said at least two processors having distinctly different native instruction sets and wherein a single operating system maintains a separate ready queue for each of said at least two processors for controlling scheduling of operations on said at least two processors, said method comprising the steps of:
   (1) selecting a first processor from said at least two processors for executing a first portion of a mixed mode binary code file including instructions native to said first processor;
   (2) executing under control of said operating system said first portion of said mixed mode binary code file on said first processor;
   (3) detecting in said operating system when a processor change is required to execute a second portion of said mixed mode binary code file including instructions native to said first processor; and
   (4) executing under control of said operating system said second portion of said mixed mode binary code file on a second-processor.

20. The method according to claim 19, wherein said mixed mode code file includes an instruction stream which is unrecognizable by said at least two processors, said instruction stream placed in said mixed mode binary code file between said first portion of code recognizable by said first processor and said second portion of code recognizable by said second processor, step (3) comprising the steps of:
   a. if said first processor is presented with said unrecognizable instruction stream, generating an unexpected entry into said operating system, said unexpected entry indicating that a processor switch may be required; and
   b. determining whether a processor switch is required by determining whether code following said unrecognizable instruction stream is unrecognizable to said first processor and recognizable to said second process; and
   c. if a processor switch is required, transferring a thread associated with said mixed mode code file to said second processor for executing said second portion of code following said unrecognizable instruction on said second processor.

21. The method according to claim 19, wherein said mixed mode code file includes an instruction placed between said first portion of code recognizable by said first processor and a second portion of code recognizable by said second processor wherein said instruction is readable by said at least two processors, said instruction including an operand for identifying which of said first and second processors is required for executing code following said instruction, step (3) comprising:
   (1) while executing said first portion of said mixed mode binary code on said first processor, reading said instruction which is readable by said at least two processors;
   (2) determining from said instruction whether a processor switch is required for executing code which follows said instruction; and
   (3) if a processor switch is required, transferring a thread associated with said mixed mode code file from said first processor to said second processor which is capable of executing said code which follows said instruction.

22. An operating system method for executing mixed mode binary code files in symmetric heterogenous multi-processor systems having at least two processors coupled to a memory, each of said at least two processors having distinctly different native instruction sets and wherein a single operating system maintains a separate ready queue for each of said at least two processors for controlling scheduling of operations on said at least two processors, said method comprising the steps of:

(1) including a jacket library in said mixed mode code file, said jacket library comprising single mode code readable by one of said at least two processors;

(2). executing under control of said operating system said mixed mode binary code file on a first processor of said at least two processors;

(3). when said jacket library is called by said first processor, determining in said operating system whether a processor switch is necessary for executing said single mode code in said jacket library; and (4). if a processor switch is required, transferring under control of said operating system a thread associated with said mixed mode code file to a processor which is capable of executing said single mode code in said jacket library.

23. A computer program product comprising computer usable media having computer readable operating system program code embodied in the media for controlling a heterogeneous multi-processor computer system including at least two processors coupled to a memory and having distinctly different native instruction sets, the computer readable operating system program code comprising:

a computer readable program code that causes said computer system to schedule and execute process threads on said at least two processors, including process threads having instructions native to a plurality of said at least two processors, wherein the first computer readable program code causes said computer system to transition a process thread from one of the at least two processors to another of said at least two processors when the instructions of the process thread transition from instructions native to the one of the at least two processors to instructions native to the other of the at least two processors.

* * * * *